(12) United States Patent
Nagasaka et al.

(10) Patent No.: US 8,291,775 B2
(45) Date of Patent: Oct. 23, 2012

(54) TORQUE SENSOR AND ROBOT APPARATUS

(75) Inventors: Kenichiro Nagasaka, Tokyo (JP);
Yasunori Kawanami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/027,791

(22) Filed: Feb. 15, 2011

(65) Prior Publication Data

US 2011/0239788 A1  Oct. 6, 2011

(30) Foreign Application Priority Data

Mar. 30, 2010 (JP) ................................. 2010-076781

(51) Int. Cl.
*G01L 1/22* (2006.01)
*G01L 3/00* (2006.01)
(52) U.S. Cl. .......... 73/862.338; 73/862.044; 73/862.041
(58) Field of Classification Search ..... 73/862.041–862.045, 862.331–862.335, 73/862.191, 862.325, 862.338
See application file for complete search history.

(56) References Cited

U.S. PATENT DOCUMENTS

| | | | | |
|---|---|---|---|---|
| 4,550,617 A | * | 11/1985 | Fraignier et al. | 73/862.042 |
| 4,573,362 A | * | 3/1986 | Amlani | 73/862.045 |
| 4,640,138 A | * | 2/1987 | Meyer et al. | 73/862.045 |
| 4,723,450 A | * | 2/1988 | Coulter | 73/862.191 |
| 4,724,711 A | * | 2/1988 | Sakakibara et al. | 73/862.322 |
| 4,754,652 A | * | 7/1988 | Coulter et al. | 73/862.191 |
| 4,821,582 A | * | 4/1989 | Meyer et al. | 73/862.045 |
| 5,193,401 A | * | 3/1993 | Bridges | 73/862.195 |
| 5,222,400 A | * | 6/1993 | Hilton | 73/862.043 |
| 5,315,882 A | * | 5/1994 | Meyer et al. | 73/862.44 |
| 5,513,536 A | * | 5/1996 | Reger et al. | 73/862.191 |
| 5,591,924 A | * | 1/1997 | Hilton | 73/862.043 |
| 5,894,094 A | * | 4/1999 | Kuchler et al. | 73/862.044 |
| 5,969,268 A | * | 10/1999 | Sommerfeld et al. | 73/862.041 |
| 6,575,031 B2 | * | 6/2003 | Haeg et al. | 73/503 |
| 6,915,708 B2 | * | 7/2005 | Isono | 73/862.041 |

(Continued)

FOREIGN PATENT DOCUMENTS

JP  2009-95959  5/2009

OTHER PUBLICATIONS

U.S. Appl. No. 13/181,741, filed Jul. 13, 2011, Kawanami, et al.

*Primary Examiner* — Lisa Caputo
*Assistant Examiner* — Jonathan Dunlap
(74) *Attorney, Agent, or Firm* — Oblon, Spivak, McClelland, Maier & Neustadt, L.L.P.

(57) ABSTRACT

Provided is a torque sensor including a first rotating body, a second rotating body, a strain body, and a detection element. The first rotating body is rotatable around an input shaft. The second rotating body is rotatable around an output shaft. The strain body includes a first engaging portion. The first engaging portion is separated from at least one of the rotating bodies in a first direction parallel to the input shaft, a second direction perpendicular to the first direction, and a third direction around the input shaft and is capable of engaging to the at least one of the rotating bodies in the third direction. The strain body transmits a rotational torque to the third direction between the first rotating body and the second rotating body. The detection element is provided to the strain body to measure a strain of the strain body due to the rotational torque.

11 Claims, 9 Drawing Sheets

U.S. PATENT DOCUMENTS

| | | | |
|---|---|---|---|
| 7,743,672 B2 * | 6/2010 | Kurtz et al. | 73/862.046 |
| 8,006,574 B2 * | 8/2011 | Meyer | 73/862.627 |
| 2009/0105878 A1 | 4/2009 | Nagasaka | |
| 2009/0314104 A1 * | 12/2009 | Lohr et al. | 73/862.338 |
| 2010/0005907 A1 * | 1/2010 | Kato et al. | 73/862.044 |
| 2010/0050785 A1 * | 3/2010 | Roessingh et al. | 73/862.191 |
| 2011/0314935 A1 * | 12/2011 | Krippner et al. | 73/862.045 |

* cited by examiner

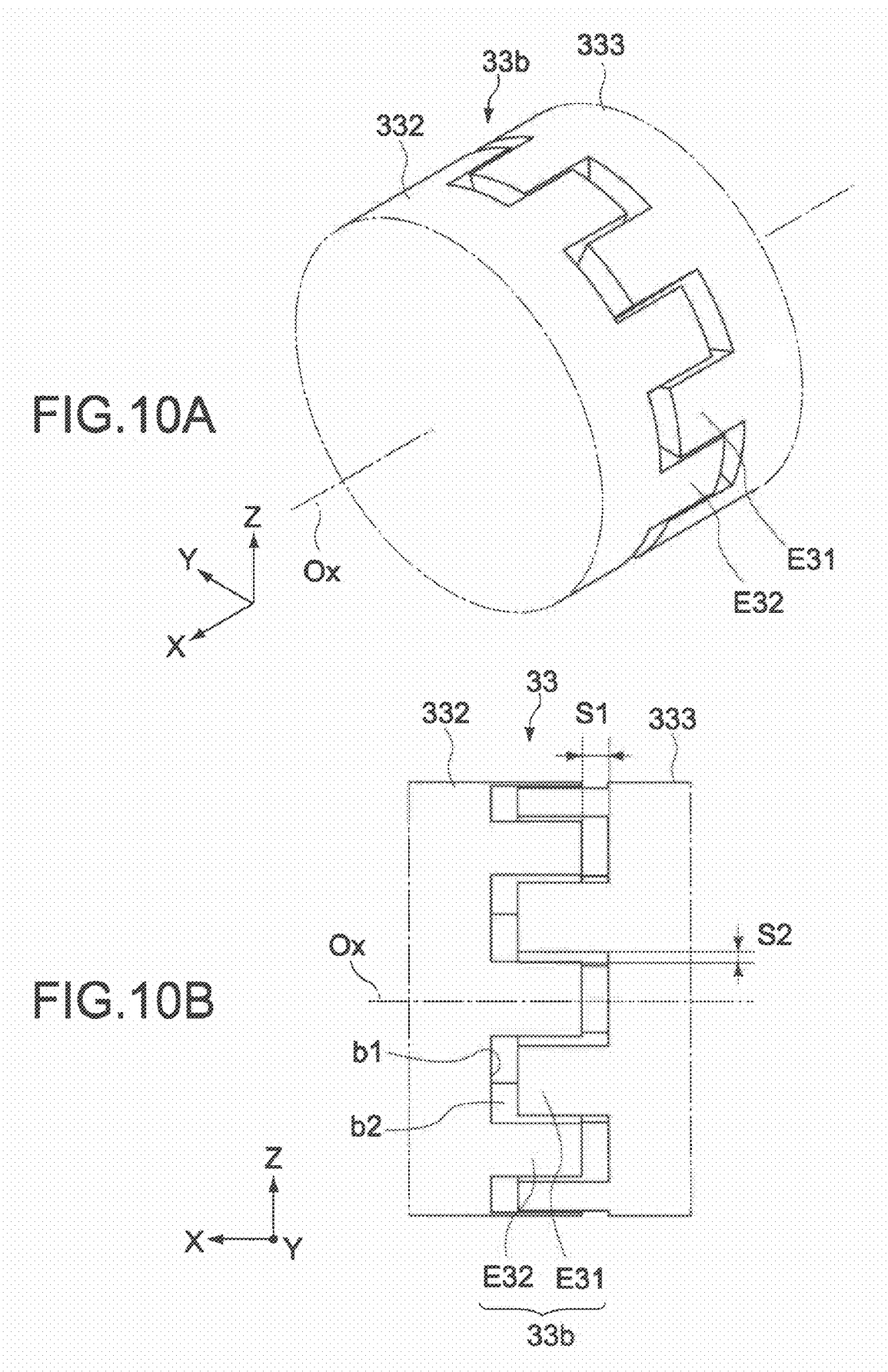

TORQUE SENSOR AND ROBOT APPARATUS

BACKGROUND OF THE INVENTION

1. Field of the Invention

The present invention relates to a torque sensor configured to detect a rotational torque transmitted from an input shaft to an output shaft, and a robot apparatus including the same.

2. Description of the Related Art

In recent years, torque sensors have been applied, for example, to an actuator control apparatus employing a force control system and to a driving system such as a haptic device for providing an operator with a sense of force and a tactile sense in addition to visual information and audio information. Here, the force control means a control method for directly receiving a target value of a force to be applied to a work object and realizing the force indicated by the target force. Further, as an output torque is detected and fed back with higher accuracy, more flexible interaction services can be achieved through force orders. Further, the haptic device is a device configured to provide in a realistic manner a user with a sense that the user touches or holds an object in an environment, which is actually not accessible by the user. The haptic device is used in entraining in medical field or other specific techniques, or in a distal procedure in a virtual environment such as a microcosm or an ocean, or a specific or hazard environment such as an atomic reactor. For example, Japanese Patent Application Laid-open No. 2009-95959 discloses a control system of sensing an unknown environment, obtaining an appropriate external force from the ambient environment changing in time, and adjusting a generation force of an actuator so that a target procedure can be achieved.

In general, the torque sensor is provided to a rotational portion supported through a bearing. The torque sensor includes a strain portion to be strained due to a torsion moment, and measures a strain of the strain portion, to thereby detect a rotational torque of the rotational portion.

SUMMARY OF THE INVENTION

However, it is difficult to completely cancel, through the bearing, vibrations of the rotation portion in the radial direction. Therefore, outputs of the torque sensor are easy to be significantly varied even with minute vibrations generating in the rotational portion. By the way, the torque sensor is often fastened with screws to the rotational portion, and the strain generated on the strain portion is also influenced by the fastening forces of the screws. The fastening forces of the screws are varied due to the magnitude of loads and the vibrations of the rotational portion, which makes the torque sensor easier to be influenced by the loads and the vibrations.

In order to overcome the above-mentioned problems, it may be conceivable that a design that portions fastened with the screws are provided geometrically away from the strain body as much as possible is employed. However, the above-mentioned design leads to an increase of the size of the torque sensor, and hence it is difficult to apply the above-mentioned design to an application where a reduction in size and weight is demanded, for example, a mobile robot. Further, in order to eliminate vibration components, a design with tight fittings and dimensional tolerance with less loosening is basically employed. As a result, a stress among mechanical components is increased, and hence the torque sensor portion becomes easier to be influenced by compression and pulling forces by other components and fastening forces of the other components.

In view of the circumstances as described above, there is a need for providing a downsized torque sensor capable of suppressing effects of loads and vibrations and a robot apparatus including the same.

In view of the above-mentioned circumstances, according to an embodiment of the present invention, there is provided a torque sensor including: a first rotating body rotatable around an input shaft; a second rotating body rotatable around an output shaft; a strain body; and a detection element.

The strain body includes a first engaging portion. The first engaging portion is separated from at least one of the first rotating body and the second rotating body in a first direction parallel to the input shaft, a second direction perpendicular to the first direction, and a third direction around the input shaft and is capable of engaging to the at least one of the first rotating body and the second rotating body in the third direction. The strain body transmits a rotational torque to the third direction between the first rotating body and the second rotating body.

The detection element is provided to the strain body to measure a strain of the strain body due to the rotational torque.

The above-mentioned torque sensor has a structure in which the first rotating body and the second rotating body are divided from each other, and the rotational torque is transmitted through the strain body from the first rotating body to the second rotating body. The detection element measures the strain generated on the strain body, and detects the rotational torque. In this case, the strain body includes the first engaging portion, which is capable of moving relative to the at least one of the first rotating body and the second rotating body in the first direction, the second direction, and the third direction, and which is capable of engaging to the third direction.

With this, in an inside or an input/output portion of the torque sensor, there is formed a mechanical decoupling structure in which the strain body is not coupled to the at least one of the first rotating body and the second rotating body in the first direction and the second direction and the strain body is substantially not coupled to the at least one of the first rotating body and the second rotating body in the third direction. Therefore, the strain body has a predetermined degree of freedom in the above-mentioned three directions. As a result, effects with respect to the vibration components are reduced as much as possible, and thus a highly accurate detection of the rotational torque through the detection element can be realized. Further, the torque sensor has the above-mentioned mechanical decoupling structure, and hence it is possible to prevent the torque sensor from being increased in size.

The first rotating body and the second rotating body may be formed of a pair of concentric annular bodies, the pair of concentric annular bodies being arranged to be opposed to each other in the second direction and having diameters different from each other. In this case, the strain body includes a plurality of shaft portions radially extending in the second direction between the first rotating body and the second rotating body.

With this configuration, it is possible to prevent a thickness dimension along the first direction from being increased, and hence it is possible to make the torque sensor thinner.

Meanwhile, the first rotating body and the second rotating body may be formed of a pair of annular bodies, the pair of annular bodies being arranged to be opposed to each other in the first direction. In this case, the strain body includes a cylindrical portion extending in the first direction between the first rotating body and the second rotating body.

With this configuration, it is possible to prevent a diameter dimension along the second direction from being increased, and hence it is possible to reduce the size of the torque sensor.

According to another embodiment of the present invention, there is provided a robot apparatus including a rotary drive source, a first rotating body, a second rotating body, a strain body, and a detection element.

The first rotating body includes an input shaft and is rotatable around the input shaft when received a rotational torque from the rotary drive source.

The second rotating body includes an output shaft and is rotatable around an output shaft.

The strain body includes a first engaging portion.

The first engaging portion is separated from at least one of the first rotating body and the second rotating body in a first direction parallel to the input shaft, a second direction perpendicular to the first direction, and a third direction around the input shaft and is capable of engaging to the at least one of the first rotating body and the second rotating body in the third direction. The strain body transmits a rotational torque to the third direction between the first rotating body and the second rotating body.

The detection element is provided to the strain body to measure a strain of the strain body due to the rotational torque.

According to the above-mentioned robot apparatus, a highly accurate detection of the rotational torque through the torque sensor configured in the above-mentioned manner can be ensured. Thus, a highly accurate control of rotation of the output shaft can be realized. At the same time, it is possible to detect loads acting on the output shaft side with high accuracy. Further, it is possible to prevent the torque sensor from being increased in size, and hence the articulations of the robot apparatus, and even the robot apparatus itself, can be downsized.

According to the embodiments of the present invention, it is possible to suppress the vibration components from being transmitted to the strain body without increasing the size of the torque sensor, and hence a highly accurate detection of the rotational torque can be realized.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 are an enlarged view and a side view of a main part of the torque sensor according to the third embodiment of the present invention.

DESCRIPTION OF PREFERRED EMBODIMENTS

Hereinafter, embodiments of the present invention will be described with reference to the drawings.
<First Embodiment>

Figure 1:
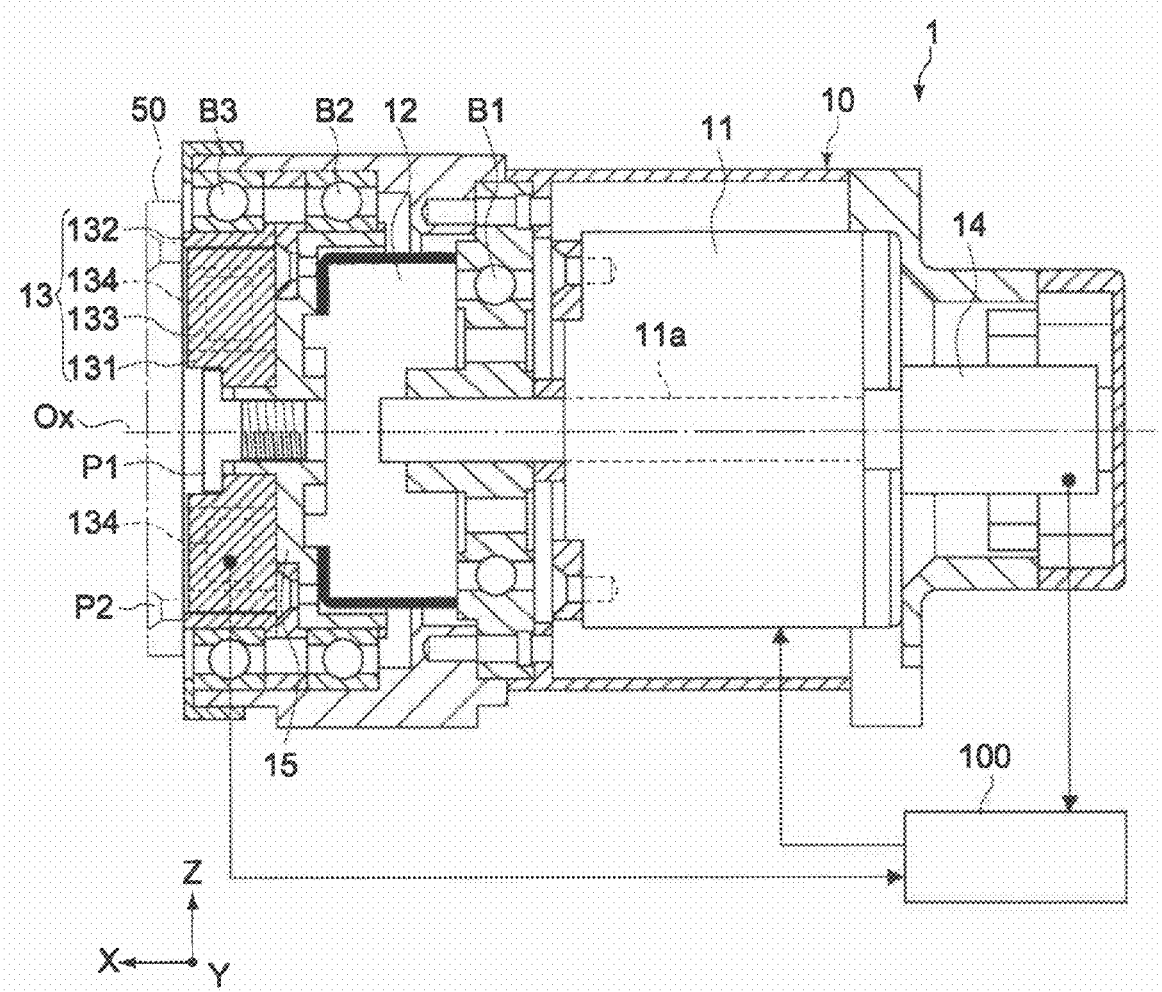
FIG. 1 is a sectional view of an actuator unit including a torque sensor according to an embodiment of the present invention.

FIG. 1 is a sectional view of an actuator unit including a torque sensor according to an embodiment of the present invention. The actuator unit 1 detects a rotational torque generated when a rotational driving force generated by an actuator is transmitted to an output member, and supplies its detection signal to a control portion. The actuator unit 1 is applied to articulations of an articulated robot apparatus, for example, articulations of the hands, the legs, the neck, the waist, and the like.

[Configuration of Actuator Unit]

The actuator unit 1 includes an actuator 11, a speed reducer 12, a torque sensor 13, an encoder 14, and a casing 10 accommodating those components. It should be noted that in FIG. 1, the X-axis direction, the Y-axis direction, and the Z-axis direction indicates three axis directions orthogonal to each other.

The actuator 11 includes a driving shaft 11a extending in the X-axis direction in FIG. 1, and is constituted of an electric motor configured to rotate the driving shaft 11a around an axis thereof (around X-axis direction). The actuator 11 is controlled by a control portion 100 to be driven. The encoder 14 is connected to the driving shaft 11a so as to detect the r.p.m. of the driving shaft 11a. An output of the encoder 14 is supplied to the control portion 100 so that the r.p.m. of the driven actuator 11 is monitored or controlled.

The speed reducer 12 is connected to the driving shaft 11a. The speed reducer 12 reduces the rotational speed, which is input from the driving shaft 11a, at a predetermined reduction ratio, to thereby generate the rotational driving force having a predetermined rotational torque. As a result, a rotation-transmitting member 15 is rotated at the above-mentioned rotational speed. The rotation-transmitting member 15 is fixed between an output end of the speed reducer 12 and an input end of the torque sensor 13. The speed reducer 12 and the rotation-transmitting member 15 are supported through a bearing B1 and a bearing B2 to the casing 10 so as to be rotatable around the X-axis. For the speed reducer 12, various types of reducers may be adopted. For example, a Harmonic Drive speed reducer ("Harmonic Drive" is a registered trademark of Harmonic Drive Systems inc.) is applied.

The torque sensor 13 transmits the rotational torque, which is transmitted through the rotation-transmitting member 15 from the speed reducer 12, to an output member 50. At the same time, the torque sensor 13 measures the above-mentioned rotational torque. The torque sensor 13 includes, as will be described later, an inner ring 131 provided through a screw member P1 to the rotation-transmitting member 15, and an outer ring 132 provided through screw members P2 to the output member 50. The torque sensor 13 transmits a rotational output of the speed reducer 12 to the output member 50, to thereby rotate the output member 50 around the X-axis. The torque sensor 13 is supported through a bearing B3 to the casing 10 so as to be rotatable around the X-axis.

[Torque Sensor]

Figure 2:
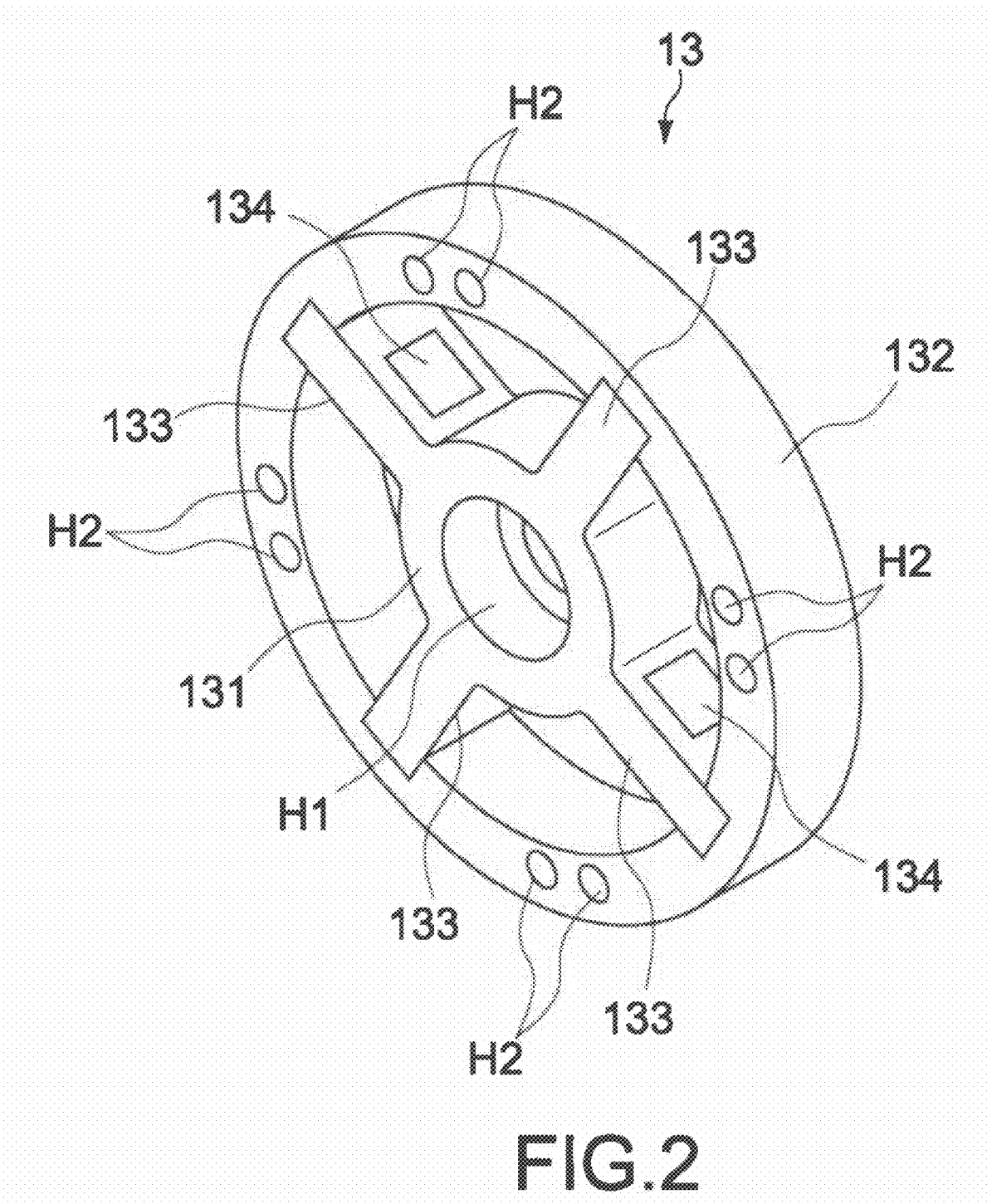
FIG. 2 is a perspective view of an entire torque sensor according to a first embodiment of the present invention.
Figure 3:
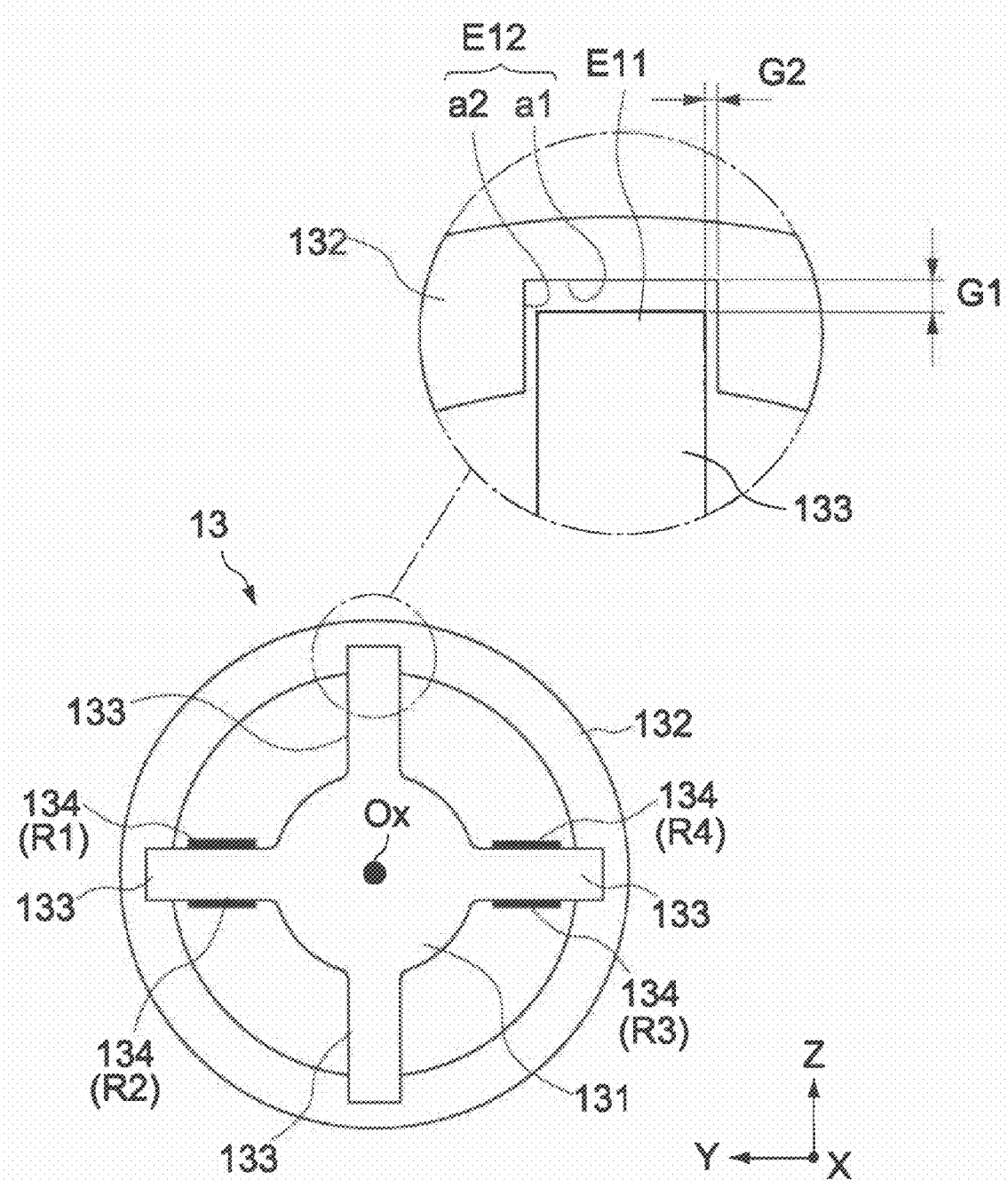
FIG. 3 is a front view of the torque sensor with an enlarged view of a main part of the torque sensor.

Next, the torque sensor 13 will be described in details. FIG. 2 is a perspective view of the entire torque sensor 13. FIG. 3 is a front view of the torque sensor 13 with an enlarged view of a main part of the torque sensor 13.

The torque sensor 13 includes the inner ring 131 (first rotating body), the outer ring 132 (second rotating body), strain bodies 133, and detection elements 134 attached to the strain bodies 133.

In the first embodiment, the inner ring 131 and the outer ring 132 are formed of a pair of concentric annular bodies. The pair of concentric annular bodies are arranged so as to be opposed to each other in a direction perpendicular to the X-axis direction, that is, a direction parallel to the YZ plane, and have diameters different from each other. The strain bodies 133 are integrally formed with the inner ring 131. The inner ring 131 is supported through the strain bodies 133 to the outer ring 132. The materials of the inner ring 131, the outer ring 132, and the strain bodies 133 are not particularly limited, and various structural materials made of an iron and steel material and a non-ferrous metal material can be used for the materials. For example, there may be used a material relatively easy to be elastically deformed when receives the rotational torque generated through the speed reducer 12.

In the center portion of the inner ring 131, there is formed a screw hole H1 into which the screw member P1 is to be inserted. The screw hole H1 is formed coaxially to an output shaft of the speed reducer 12. When the screw member P1 is fastened through the screw hole H1 to the rotation-transmitting member 15, the inner ring 131 is fixed to the output shaft of the speed reducer 12. With this, the inner ring 131 is rotatable around the output shaft of the speed reducer 12. Here, the output shaft of the speed reducer 12 serves as an input shaft of the inner ring 131s.

Meanwhile, in the outer ring 132, there are formed screw holes H2 into which the screw members P2 are to be inserted. The outer ring 132 is rotatable around an output shaft Ox coaxial to the above-mentioned input shaft. Further, the outer ring 132 is capable of rotating the output member 50 around the above-mentioned output shaft. In the inner peripheral surface of the outer ring 132, there are formed engaging recessed portions E12 (second engaging portions) to be engaged to ends of the strain bodies 133. Further, the outer ring 132 is, in the outer peripheral surface thereof, supported through the bearing B3 to the casing 10 so as to be rotatable.

The strain bodies 133 are formed of a plurality of shaft members radially extending in a direction parallel to the YZ plane between the inner ring 131 and the outer ring 132. In the first embodiment, the strain bodies 133 are formed of four shaft portions (beams) protruding at equiangular intervals from the outer peripheral portion of the inner ring 131 to the inner peripheral portion of the outer ring 132.

As shown in FIG. 3, the ends of the strain bodies 133 are formed as engaging portions E11 (first engaging portions) each having a cubic shape, which are respectively engaged to the engaging recessed portions E12 of the outer ring 132. The strain bodies 133 have a thickness equal to or smaller than that of the outer ring 132 in the X-axis direction, and are fit into the outer ring 132 in the X-axis direction. The engaging recessed portions E12 are constituted of grooves each having a rectangular cross-section. Each of the grooves includes a bottom surface a1 and a pair of side surfaces a2. The bottom surface a1 is opposed to one of the engaging portions E11 in such a state that a gap G1 being formed between the bottom surface a1 and the engaging portion E11 in the direction perpendicular to the X-axis direction. The pair of side surfaces a2 are opposed to one of the engaging portions E11 in such a state that gaps G2 being formed between each of the side surfaces a2 and the engaging portion E11 in the direction around the X-axis. Here, each of the gaps G2 is sufficiently smaller than the gap G1.

Typically, the speed reducer often generates vibration components in an axial direction (X-axis direction) and a radial direction (direction perpendicular to X-axis direction), and hence the speed reducer may generate a vibration in a rotational direction in engagement between gears in the speed reducer. Further, the bearing is not capable of canceling all vibrations in the radial direction of the rotating shaft. As a result, in a conventional torque sensor, when the vibration components to the above-mentioned three directions, which cannot be cancelled by the bearing, are input to the strain body, multi axis forces other than the rotational torque are included in the output of the torque sensor.

In view of this, in the first embodiment, the torque sensor 13 has a decoupling structure in which the inner ring 131 and the outer ring 132 are divided as described above. Thus, each of the engaging portions E11 is separated from each of the engaging recessed portions E12 through the gaps G1 in the radial direction and through the gaps G2 in the direction about the axis of the output shaft Ox. Further, each of the engaging portions E11 is separated from each of the engaging recessed portions E12 also in the axial direction of the output shaft Ox. With this, a degree of freedom of the strain bodies 133 in the above-mentioned three directions is increased, and hence the deformation of the strain bodies 133 due to the vibration components in the three directions is suppressed, and the vibration components are prevented from being added to the output of the torque sensor 13.

The size of each of the gap G1 and the gaps G2 is not particularly limited, and can be appropriately set as long as a rotational dynamic force of the speed reducer 12 can be suitably transmitted to the output member 50. In the first embodiment, the size of each of the gaps G2 is set to be sufficiently smaller than that of the gap G1. The gaps G2 is provided for canceling a minute strain, which cannot be cancelled even by the bearings B1 to B3. Therefore, even when the size of each of the gaps G2 is set to be minute, it is possible to sufficiently achieve an effect of reducing moments of other axis forces. The size of each of the gaps G2 can be set to be from about 0.2 mm to about 0.5 mm, for example.

Figure 4:
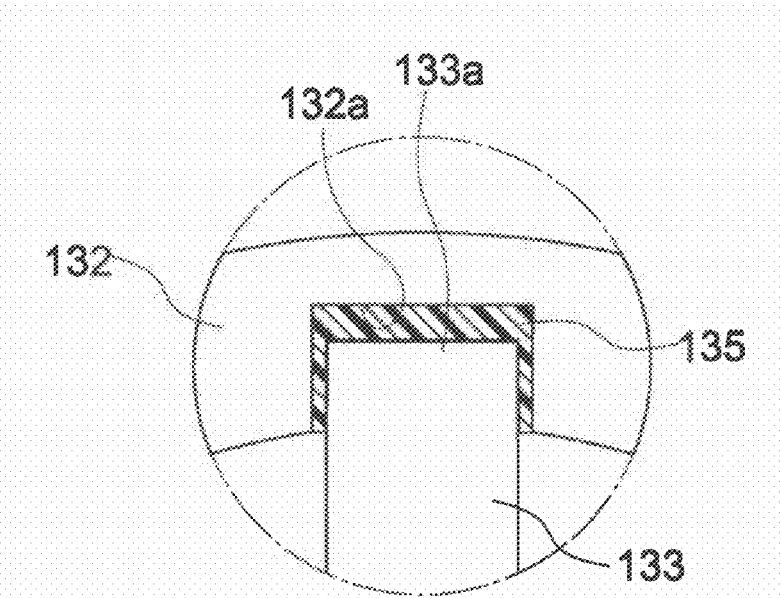
FIG. 4 is an enlarged view of a main part showing a modification of the torque sensor.

It should be noted that, as shown in FIG. 4, the gap between each of the engaging portions E11 and each of the engaging recessed portions E12 may be filled with a filler 135 made of an elastic material. With this, the vibration components to be transmitted to the strain bodies 133 can be efficiently absorbed, and hence even a case where backlashes of an inner gear of the speed reducer 12 and the like become a problem can be accommodated. As the filler, there is used a material having a low elastic modulus, which has an elastic modulus lower than those of the outer ring 132 and the strain bodies 133 and allows micro motion of the engaging portions E11 with respect to the engaging recessed portions E12. For example, in addition to a rubber and a resin solid material, it is possible to apply as the filler a liquid material or a semi-solid material of oil or grease and the like.

Next, the detection elements 134 will be described.

The detection elements 134 detect a bending moment acting on the strain bodies 133, and measure the strain of the strain bodies 133. The detection signals of the detection elements 134 are output to the control portion 100. The detection elements 134 are typically strain gauges configured to measure a deformation amount based on changes of an electric resistance. However, in addition to this, for example, elements configured to measure the deformation amount based on changes of a magnetic property may be used.

The detection elements 134 are attached to a pair of strain bodies 133 opposed to each other while sandwiching the output shaft Ox therebetween. Specifically, as shown in FIG. 3, a pair of detection elements 134 are arranged on both side surfaces of each of the strain bodies 133 as viewed in a rotational direction of the output shaft Ox. Then, when two pairs of detection elements 134 are bridge-connected together, a four-gauge bridge (Wheatstone bridge) can be configured. As shown in FIG. 3, the strain bodies 133 are formed in such a manner that the strain bodies 133 are opposed to each other while sandwiching the output shaft Ox therebetween, that is, the four-gauge bridge is axisymmetrically formed, and hence, there can be configured a sensor system to cancel even an effect caused when the strain bodies are stretched due to problems including a decentering of the output shaft, a temperature change, and the like.

FIG. 3 shows two strain bodies with four detection elements 134 being attached. The strain bodies are opposed to each other while sandwiching the output shaft Ox therebetween. One pair of detection elements 134, which are attached to both sides of one strain body of the above-mentioned two strain bodies, are set to have electric resistance values R1 and R2, respectively. Further, the other pair of detection elements 134, which are attached to both sides of the other strain body of the above-mentioned two strain bodies, are set to have electric resistance values R3 and R4, respectively. A circuit is formed, which connects in series the detection element 134 having the electric resistance R1 and the detection element 134 having the electric resistance R4 to each other. Another circuit is formed, which connects in series the detection element 134 having the electric resistance R2 and the detection element 134 having the electric resistance R3 to each other. The above-mentioned circuits are connected in parallel.

Figure 5:
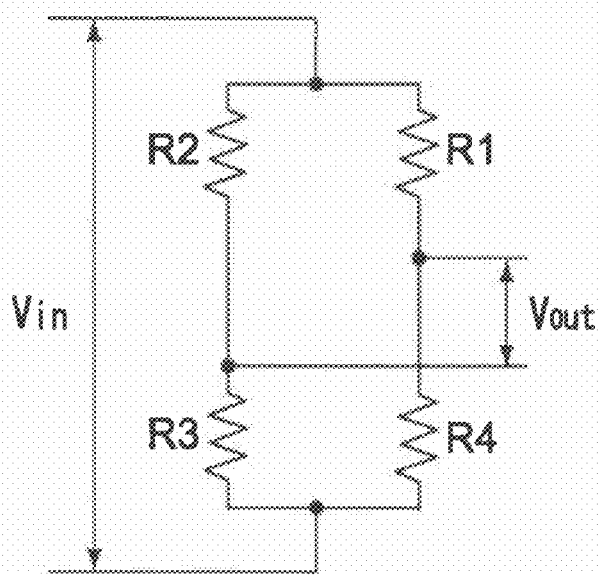
FIG. 5 is an equivalent circuit schematic of the torque sensor.

FIG. 5 shows an equivalent circuit using a four-gauge method. When the rotational torque around the output shaft Ox is applied to the strain bodies 133, a strain is generated. Then, each of the detection elements 134 is also minutely deformed, and thus each resistance is varied depending on the deformation amount. Further, when a voltage Vin is applied to both ends of the circuit obtained by connecting a group of resistances in parallel, a potential difference Vout appearing between midpoints of the group of resistances becomes a sensor output of the torque sensor 13. A relationship between the voltage Vin and the voltage Vout is as follows.

$$V\text{out}=V\text{in}[\{R3/(R2+R3)\}-\{R4/(R1+R4)\}] \quad (1)$$

The control portion 100 is constituted of a computer. The control portion 100 includes electric power supplying circuits for the detection elements 134, an amplification circuit, a calculation circuit, and the like. Specifically, the amplification circuit and the calculation circuit serve for calculating the rotational torque of the output shaft Ox acting on the strain bodies 133 based on outputs of the strain bodies 133 and the above-mentioned Expression (1). The control portion 100 controls, according to the output of the torque sensor 13, driving of the actuator 11, or outputs the rotational torque measured to other outside circuits.

[Operation of Actuator Unit]

Next, the description will be made of an operation example of the actuator unit 1 configured in the above-mentioned manner.

When the actuator 11 receives an input of a driving signal from the control portion 100, the actuator 11 generates the rotational driving force for rotating the driving shaft 11a about the axis thereof. The speed reducer 12 reduces at a predetermined reduction ratio the rotational speed input through the driving shaft 11a, and generates the rotational driving force. Here, the rotational driving force has been converted into a predetermined rotational torque. The output of the speed reducer 12 is transmitted through the rotation-transmitting member 15 and the torque sensor 13 to the output member 50. In this manner, the output member 50 is rotated around the output shaft Ox.

The torque sensor 13 detects the rotational torque of the output member 50, and supplies the output thereof to the control portion 100. The control portion 100 controls, according to the output of the torque sensor 13 and the output of the encoder 14, driving of the actuator 11 in such a manner that the rotational torque of the output member 50 becomes a predetermined value.

The torque sensor 13 of the first embodiment has a structure in which the inner ring 131 and the outer ring 132 are divided from each other, and the output torque of the speed reducer 12 is transmitted through the strain bodies 133 from the inner ring 131 to the outer ring 132. The detection elements 134 measure the strain generated on the strain bodies 133 due to the rotational torque around the output shaft Ox, and output the measuring signal thereof to the control portion 100.

In this time, each of the strain bodies 133 is capable of moving relative to the outer ring 132 within a range of the gap G1 and the gaps G2 in the radial direction and the rotational direction of the output shaft Ox, respectively. Further, regarding the axial direction, the strain bodies 133 are not restrained by the outer ring 132. That is, in an inside of the torque sensor 13, there is formed a mechanical decoupling structure in which the strain bodies 133 are not coupled to the outer ring 132 in the axial direction and the radial direction and the strain bodies 133 are substantially not coupled to the outer ring 132 in the rotational direction. Therefore, each of the strain bodies 133 has a predetermined degree of freedom with respect to the outer ring 132 in each of the above-mentioned three directions. As a result, effects with respect to the vibration components due to pressurizing by the bearings B1 to B3 against the inner ring 131 and the outer ring 132, to a minute vibration of a gear inside the speed reducer 12, to fastening forces of the screw members P1 and P2 are reduced as much as possible. Thus, a highly accurate detection of the rotational torque through the detection elements 134 can be realized.

Figure 6:
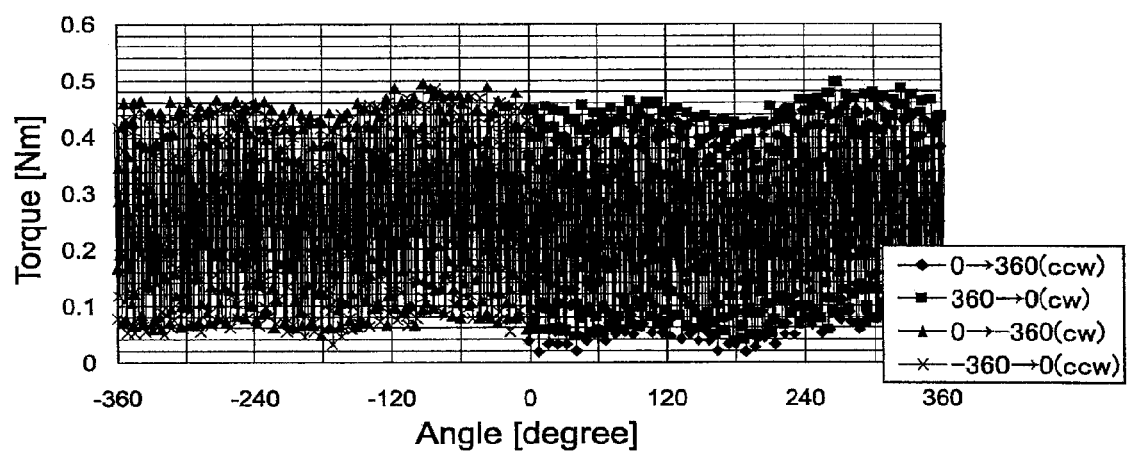
FIG. 6 is an experimental result showing an output property of a conventional torque sensor without a mechanical decoupling structure.

FIG. 6 shows exemplary output values of a torque sensor without the mechanical decoupling structure. Here, the torque sensor without the mechanical decoupling structure means a structure in which the strain bodies are integrally formed with the inner ring and the outer ring. In this experiment, sensor outputs when the drive shaft of the actuator is rotated in a normal direction one time and is rotated an inverse direction one time are plotted.

Figure 7:
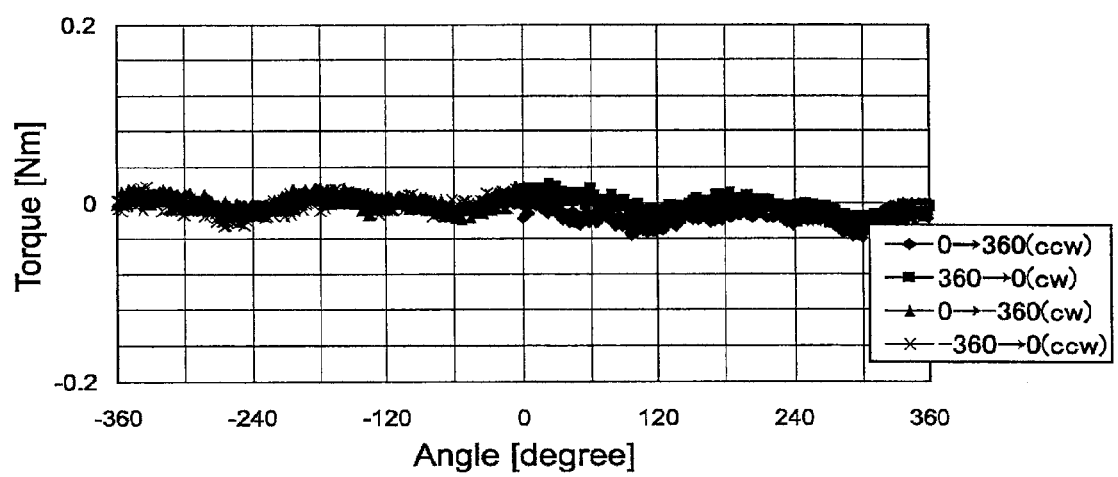
FIG. 7 is an experimental result showing an output property of the torque sensor according to the embodiment of the present invention including the mechanical decoupling structure.

In contrast, FIG. 7 shows exemplary output values of the torque sensor 13 according to the first embodiment when experimented in the same manner as FIG. 6. In comparison with FIG. 6 and FIG. 7, according to the first embodiment, it can be understood that torque fluctuations according to rotational angles are significantly reduced.

As described above, according to the first embodiment, the mechanical decoupling structure is formed in the inside of the torque sensor 13, and hence other axis forces other than the rotational torque being a target to be detected are prevented from influencing the torque sensor 13. That is, effects of multi axis forces caused due to pressurizing against the rotational portion by the bearings B1 to B3, to error in centering among the bearings B1 to B3, and of multi axis forces caused due to the vibrations of the speed reducer 12 and the fastening forces of the screw members P1, P2 are reduced, and hence an accurate torque measurement can be realized. With this, it is possible to detect the rotational torque acting on the output shaft of the actuator unit 1 with high accuracy, which allows an accurate torque control of the articulations and an accurate estimation of forces acting on parts of the robot.

Further, according to the first embodiment, the torque sensor 13 has the mechanical decoupling structure, and hence the sensor structure is prevented from being increased in size for the torque detection. In particular, according to the first embodiment in which the first rotating body (inner ring 131) and the second rotating body (outer ring 132) are arranged so as to be opposed to each other in the radial direction, it is possible to configure the torque sensor having a reduced size (thickness dimension) in the axial direction.

<Second Embodiment>

Next, a second embodiment of the present invention will be described.

Figure 8:
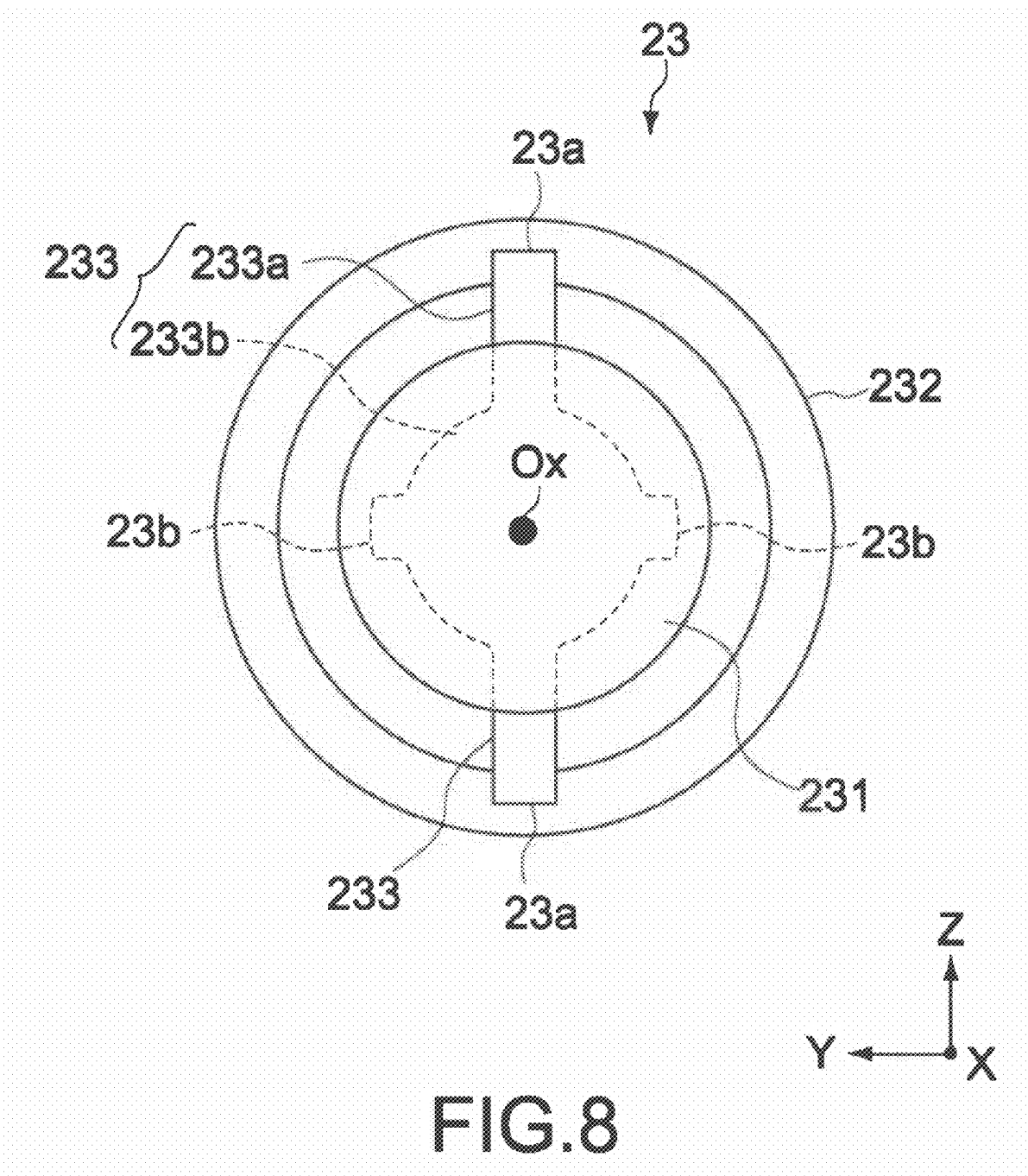
FIG. 8 is a front view of a torque sensor according to a second embodiment of the present invention.

FIG. 8 is a front view of a torque sensor according to the second embodiment. The torque sensor 23 of the second embodiment includes an inner ring 231 (first rotating body), an outer ring 232 (second rotating body), and strain bodies 233. Similarly to the first embodiment, the inner ring 231 and the outer ring 232 are formed of a pair of concentric annular bodies. The pair of concentric annular bodies are arranged so as to be opposed to each other in a direction perpendicular to the X-axis direction, that is, a direction parallel to the YZ plane, and have diameters different from each other.

The inner ring 231 includes an input shaft to which an output torque of the speed reducer is input, and the outer ring 232 includes an output shaft (Ox) for rotating an output member. The strain bodies 233 are supported between the inner ring 231 and the outer ring 232, and transmit the output torque of the speed reducer from the inner ring 231 to the outer ring 232. Although detection elements configured to detect a micro deformation of the strain bodies 233 are attached to the strain bodies 233, the illustration of the detection elements is omitted.

The torque sensor 23 according to the second embodiment has a three-division structure of the inner ring 231, the outer ring 232, and the strain bodies 233. That is, the strain bodies 233 include shaft portions 233a and a base portion 233b. The shaft portions 233a are engaged to the outer ring 232 through two engaging structures 23a. The base portion 233b is engaged to the inner ring 231 through two engaging structures 23b.

The above-mentioned engaging structures 23a, 23b are formed in such a manner that the strain bodies 233 can be separated from the inner ring 231 and the outer ring 232 in the three direction of the axial direction, the radial direction, and the rotational direction of the torque sensor 23, and hence other axis forces transmitted to the strain bodies 233 are cancelled.

According to the torque sensor 23 of the second embodiment configured in the above-mentioned manner, in comparison with the above-mentioned first embodiment, a degree of freedom of the inner ring 231 and the outer ring 232 for minutely moving relative to each other is increased. With this, it is possible to obtain a further reduction effect of the other axis forces acting on the strain bodies 233.

<Third Embodiment>

Figure 9:
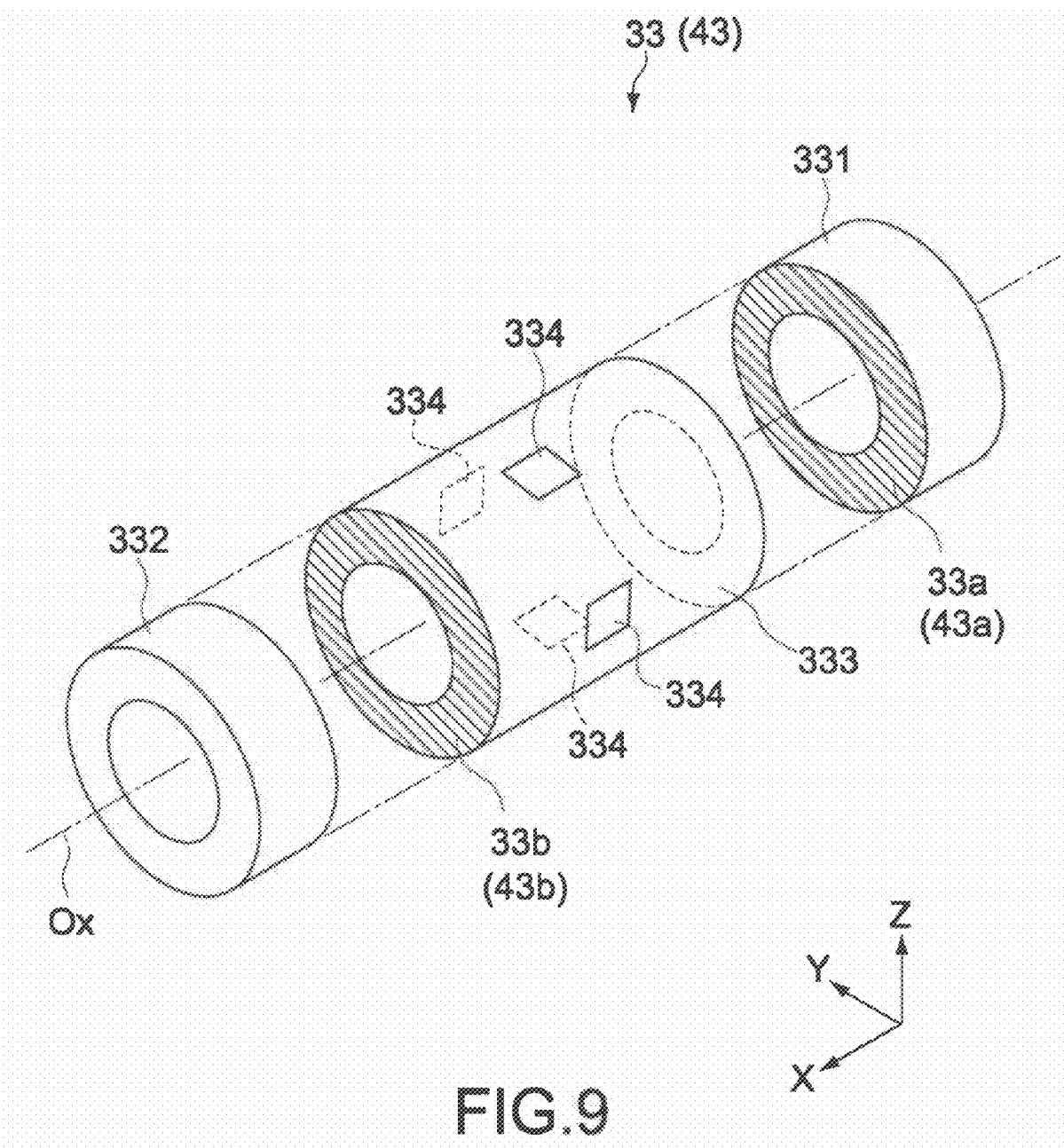
FIG. 9 is a schematic exploded perspective view of a torque sensor according to a third embodiment or a fourth embodiment of the present invention.

FIG. 9 is a schematic exploded perspective view of a torque sensor according to a third embodiment of the present invention. The torque sensor 33 of the third embodiment includes a first rotating body 331, a second rotating body 332, a strain body 333, and detection elements 334.

In the third embodiment, the first rotating body 331 and the second rotating body 332 are formed of a pair of annular bodies arranged so as to be opposed to each other in the X-axis direction. The strain body 333 has a cylindrical shape (cylindrical portion) extending between the first rotating body 331 and the second rotating body 332 in the X-axis direction. Both end portions of the strain body 333 are engaged through an engaging structure 33a and an engaging structure 33b, which are schematically shown in hatching in FIG. 9, to the first rotating body 331 and the second rotating body 332, respectively. The materials of the first rotating body 331, the second rotating body 332, and the strain body 333 are not particularly limited, and various structural materials made of an iron and steel material and a non-ferrous metal material can be used for the material. For example, there may be used a material relatively easy to be elastically deformed when receives the rotational torque generated through the speed reducer.

The first rotating body 331 includes an input shaft extending the X-axis, to which the output torque of the speed reducer is input, and is capable of rotating around the input shaft. Meanwhile, the second rotating body 332 includes an output shaft (Ox) for rotating an output member, and is capable of rotating around the output shaft. Similarly to the above-mentioned first embodiment, the first rotating body 331 and the second rotating body 332 are supported through the bearings within the casing so as to be rotatable.

FIG. 10 shows the details of the engaging structure 33b between the strain body 333 and the second rotating body 332. FIG. 10A is a perspective view of the engaging structure 33b. FIG. 10B is a side view of the engaging structure 33b. It should be noted that the engaging structure 33a between the strain body 333 and the first rotating body 331 has the same structure as the engaging structure 33b shown in those drawings, and hence the description thereof is omitted.

As shown in FIG. 10A and FIG. 10B, the strain body 333 and the second rotating body 332 are engaged to each other through the engaging structure 33b. In the strain body 333, there are formed engaging portions E31 (first engaging portions), which are engaged to engaging portions E32 (second engaging portions) formed in the second rotating body 332. The engaging portions E32 are formed to have concavities and convexities. Specifically, each of the engaging portions E32 includes a bottom surfaces b1 and a pair of side surfaces b2. The bottom surface b1 is opposed to the engaging portion E31 with a gap S1 being formed therebetween in the X-axis direction. The pair of side surfaces b2 are opposed to the engaging portion E31 with gaps S2 being formed therebetween in a direction around the X-axis.

The torque sensor 33 according to the third embodiment has a decoupling structure in which the first rotating body 331 and the second rotating body 332 are divided with respect to each other as described above. From the engaging portion E32, each of the engaging portions E31 is separated through the gap S1 in the axial direction (axial direction of output shaft Ox), and through the gaps S2 in the direction about the axis of the output shaft Ox. Further, each of the engaging portions E31 is separated from the engaging portion E32 also in the radial direction (direction perpendicular to output shaft Ox). With this, a degree of freedom of the strain body 333 in the above-mentioned three directions is increased, and hence the deformation of the strain body 333 due to the vibration components in the above-mentioned three directions is suppressed, and the vibration components are prevented from being added to the output of the torque sensor 33.

The size of each of the gaps S1 and the gaps S2 is not particularly limited, the same value as the gaps G1 and the gaps G2 described in the first embodiment may be set for the gaps S1 and the gaps S2. It should be noted that, the gap between the engaging portion E31 and the engaging portion E32 may be filled with a material having a low elastic modulus, which includes a rubber, a resin, grease, and the like (see FIG. 4).

The detection elements 334 detect a torsion moment acting on the strain body 333, and measure the strain of the strain body 333. The detection signal of the detection elements 334 is output to the control portion. The detection elements 334 are typically strain gauges configured to measure a deformation amount based on changes of an electric resistance. However, in addition to this, for example, elements configured to measure the deformation amount based on changes of a magnetic property may be used.

Two pairs of detection elements 334 are attached to a peripheral surface of the strain body 333 in such a manner that one detection element of each pair of the pairs of detection elements 334 is opposed to the other while sandwiching the output shaft Ox therebetween. Specifically, as shown in FIG. 9, the four detection elements 334 are arranged in such a manner that a direction in which the detection elements 334 in one of the pairs are opposed to each other is orthogonal to a direction in which the detection elements 334 in the other of the pairs are opposed to each other, to thereby configure the four-gauge bridge (Wheatstone bridge) similarly to the first embodiment. The orientation, the position, and the like in which each of the detection elements 334 are attached to the strain body 333 can be appropriately set.

According to the third embodiment, the mechanical decoupling structure is formed in an input/output portion of the torque sensor 33, and hence other axis forces other than the rotational torque being a target to be detected are prevented from influencing the torque sensor 33. With this, similarly to the first embodiment, it is possible to detect the rotational torque acting on the output shaft of the actuator unit with high accuracy, which allows an accurate torque control of the articulations and an accurate estimation of forces acting on parts of the robot.

Further, according to the third embodiment, the torque sensor 33 has the mechanical decoupling structure, and hence the sensor structure is prevented from being increased in size for the torque detection. In particular, according to the third embodiment in which the first rotating body 331 and the second rotating body 332 are opposed to each other in the axial direction, it is possible to configure the torque sensor having a reduced size (diameter dimension) in the radial direction.

<Fourth Embodiment>

Figure 11A:
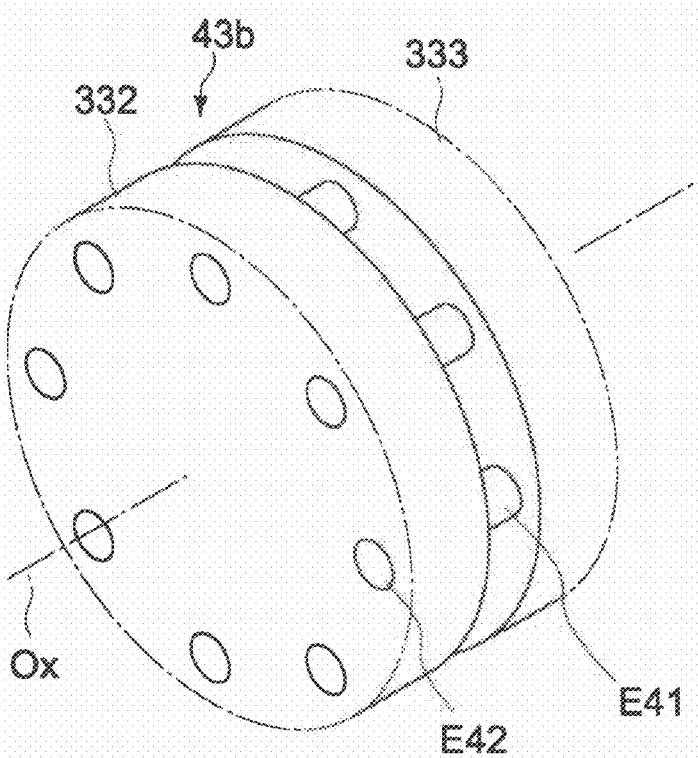
FIG. 11 are an enlarged view and a side view of a main part of the torque sensor according to the fourth embodiment of the present invention.
Figure 11B:
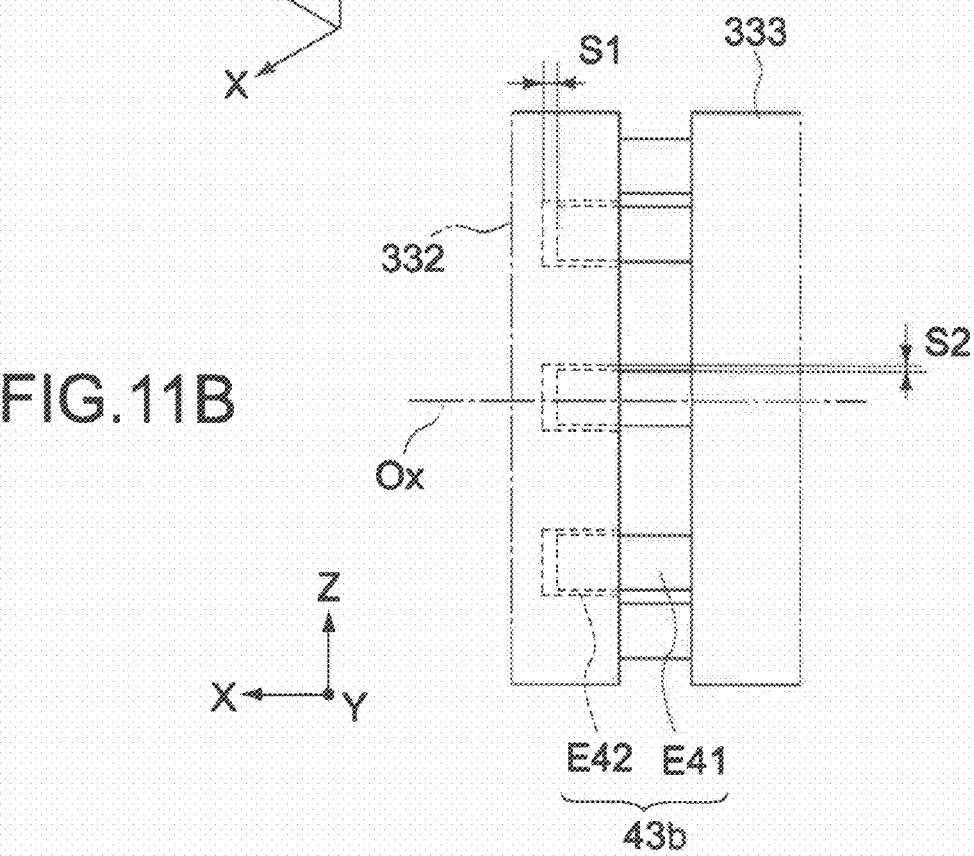

FIG. 9 and FIGS. 11A and 11B show a torque sensor according to a fourth embodiment of the present invention. In those drawings, the portions corresponding to those of the above-mentioned third embodiment are denoted by the same reference symbols, and the detailed description thereof is omitted.

The torque sensor 43 of the fourth embodiment is different from the above-mentioned third embodiment in view of engaging structures 43a, 43b between the strain body 333 and the both rotating bodies 331 and 332. FIG. 11A is a perspective view of the engaging structure 43b between the strain body 333 and the second rotating body 332. FIG. 11B is a side view of the engaging structure 43b. It should be noted that, the engaging structure 43a between the strain body 333 and the first rotating body 331 is the same as the engaging structure 43b of the shown engaging structure 43b, and hence the description thereof is omitted here.

As shown in FIG. 11A and FIG. 11B, the strain body 333 and the second rotating body 332 are engaged to each other through the engaging structure 43b. In the strain body 333, there are annularly arranged engaging portions E41 (first engaging portions), which are engaged to engaging portions E42 (second engaging portions) formed in the second rotating body 332. In the fourth embodiment, the engaging portions E41 are formed of a plurality of cylindrical shaft portions extending in the X-axis direction, and the engaging portions E42 are formed of a plurality of circular holes into which the engaging portions E41 are fitted. Each of the engaging portions E42 includes a bottom surface and an inner peripheral surface. The bottom surface is opposed to one of the engaging portions E41 with a gap S1 is formed therebetween in the X-axis direction. The inner peripheral surface is opposed to the engaging portion E41 with a gap S2 is formed therebetween in the direction around the X-axis direction.

The torque sensor 43 according to the fourth embodiment has a decoupling structure in which the first rotating body 331 and the second rotating body 332 are divided with respect to each other as described above. From the engaging portions E42, the engaging portions E41 are separated through the gaps S1 in the axial direction (axial direction of output shaft Ox), and through the gaps S2 in the direction about the axis of the output shaft Ox. Further, the engaging portion E41 is separated from the engaging portion E42 also in the radial direction (direction perpendicular to output shaft Ox). With this, a degree of freedom of the strain body 333 in the above-mentioned three directions is increased, and hence the deformation of the strain body 333 due to the vibration components in the above-mentioned three directions is suppressed, and the vibration components are prevented from being added to the output of the torque sensor 43.

According to the fourth embodiment, the mechanical decoupling structure is formed in an input/output portion of the torque sensor 43, and hence other axis forces other than the rotational torque being a target to be detected are prevented from influencing the torque sensor 43. With this, similarly to the first embodiment, it is possible to detect the rotational torque acting on the output shaft of the actuator unit with high accuracy, which allows an accurate torque control of the articulations and an accurate estimation of forces acting on parts of the robot.

Further, according to the fourth embodiment, the torque sensor 43 has the mechanical decoupling structure, and hence the sensor structure is prevented from being increased in size for the torque detection. In particular, according to the fourth embodiment in which the first rotating body 331 and the second rotating body 332 are opposed to each other in the axial direction, it is possible to configure the torque sensor having a reduced size (diameter dimension) in the radial direction.

Although the embodiments of the present invention have been described above, the present invention is not limited to the above-mentioned embodiments, and various modifications thereof can be made based on the technical idea of the present invention.

For example, although in the above-mentioned first embodiment, the structure in which the strain bodies 133 are fixed to the first rotating body (inner ring 131) and are separated from the second rotating body (outer ring 132) has been employed, it is also possible to alternatively employ a structure in which the strain bodies 133 are fixed to the second rotating body and are separated from the first rotating body.

Further, although in the above-mentioned third and fourth embodiments, the structure in which the strain body 333 is separated from the both rotating bodies 331 and 332 has been employed, it is also possible to employ a structure in which the strain body 333 is separated from only any one of the rotating bodies 331 and 332.

Further, although in the above-mentioned embodiments, the examples in which the torque sensor according to the present invention is applied to the articulations of the robot apparatus have been described, the present invention is not limited to thereto. For example, the present invention is also applicable to another torque sensor for detection of an axial torque or an output torque.

The present application contains subject matter related to that disclosed in Japanese Priority Patent Application JP 2010-076781 filed in the Japan Patent Office on Mar. 30, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A torque sensor, comprising:
a first rotating body rotatable around an input shaft;
a second rotating body rotatable around an output shaft;
a strain body, which includes a first engaging portion being separated from at least one of the first rotating body and the second rotating body in a first direction parallel to the input shaft, a second direction perpendicular to the first direction, and a third direction around the input shaft so that the first engaging portion is movable in each of the three directions relative to the at least one of the first rotating body and the second rotating body, and the first engaging portion being engageable with the at least one of the first rotating body and the second rotating body in the third direction, and which transmits a rotational torque to the third direction between the first rotating body and the second rotating body; and
a detection element provided to the strain body to measure a strain of the strain body due to the rotational torque.

2. The torque sensor according to claim 1, wherein
the first rotating body and the second rotating body are a pair of concentric annular bodies, the pair of concentric annular bodies being arranged to be opposed to each other in the second direction and having diameters different from each other, and
the strain body includes a plurality of shaft portions radially extending in the second direction between the first rotating body and the second rotating body.

3. The torque sensor according to claim 2, wherein
the first engaging portion is formed to an end of one of the plurality of shaft portions,
the at least one of the first rotating body and the second rotating body includes a second engaging portion being engageable with the first engaging portion in the third direction, and
the second engaging portion includes
a first surface opposed to the first engaging portion with a first gap being formed therebetween in the second direction, and
a second surface opposed to the first engaging portion with a second gap being formed therebetween in the third direction.

4. The torque sensor according to claim 3, wherein the second gap is smaller than the first gap.

5. The torque sensor according to claim 3, further comprising a deformable filler layer filled between the first engaging portion and the second engaging portion.

6. The torque sensor according to claim 5, wherein the deformable filler layer includes an elastic modulus lower than that of the strain body and at least one of the first rotating body and the second rotating body.

7. The torque sensor according to claim 5, wherein the deformable filler layer includes a liquid material or a semi-solid material.

8. The torque sensor according to claim 1, wherein
the first rotating body and the second rotating body are a pair of annular bodies, the pair of annular bodies being arranged to be opposed to each other in the first direction, and
the strain body includes a cylindrical portion extending in the first direction between the first rotating body and the second rotating body.

9. The torque sensor according to claim 8, wherein
the first engaging portion is formed to an end of the cylindrical portion,
the at least one of the first rotating body and the second rotating body includes a second engaging portion being engageable with the first engaging portion in the third direction, and
the second engaging portion includes
a first surface opposed to the first engaging portion with a first gap being formed therebetween in the first direction, and
a second surface opposed to the first engaging portion with a second gap being formed therebetween in the third direction.

10. The torque sensor according to claim 1, wherein a space separating the first engaging portion from the at least one of the first rotating body and the second rotating body in each of the three directions suppresses vibration transmitted between the first rotating body and the second rotating body.

11. A robot apparatus, comprising:
a rotary drive source;
a first rotating body, which includes an input shaft and is rotatable around the input shaft when received a rotational torque from the rotary drive source;
a second rotating body, which includes an output shaft and is rotatable around an output shaft;
a strain body, which includes a first engaging portion being separated from at least one of the first rotating body and the second rotating body in a first direction parallel to the input shaft, a second direction perpendicular to the first direction, and a third direction around the input shaft so that the first engaging portion is movable in each of the three directions relative to the at least one of the first rotating body and the second rotating body, and the first engaging portion being engageable with the at least one of the first rotating body and the second rotating body in the third direction, and which transmits a rotational torque to the third direction between the first rotating body and the second rotating body; and
a detection element provided to the strain body to measure a strain of the strain body due to a rotational torque.

* * * * *